US006678390B1

(12) United States Patent
Honsinger

(10) Patent No.: US 6,678,390 B1
(45) Date of Patent: Jan. 13, 2004

(54) METHOD AND COMPUTER PROGRAM FOR EMBEDDING AND EXTRACTING AN EMBEDDED MESSAGE FROM A DIGITAL IMAGE

(75) Inventor: Chris W. Honsinger, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/453,160

(22) Filed: Dec. 2, 1999

(51) Int. Cl.[7] .............................. G06K 9/00; H04L 9/00
(52) U.S. Cl. ...................... 382/100; 382/279; 382/209; 382/232; 380/51; 380/54; 713/176
(58) Field of Search ................................ 382/100, 232, 382/278, 209; 380/51, 54; 713/176

(56) References Cited

U.S. PATENT DOCUMENTS

| 5,748,783 | A | * | 5/1998 | Rhoads | 283/113 |
| 5,835,639 | A | * | 11/1998 | Honsinger et al. | 382/278 |
| 5,850,481 | A | | 12/1998 | Rhoads | |
| 5,859,920 | A | * | 1/1999 | Daly et al. | 380/54 |
| 6,044,156 | A | * | 3/2000 | Honsinger et al. | 380/54 |
| 6,259,801 | B1 | * | 7/2001 | Wakasu | 382/100 |
| 6,263,086 | B1 | * | 7/2001 | Wang | 382/100 |
| 6,307,949 | B1 | * | 10/2001 | Rhoads | 382/100 |

* cited by examiner

Primary Examiner—Bhavesh M. Mehta
Assistant Examiner—Aaron Carter
(74) Attorney, Agent, or Firm—Peyton C. Watkins

(57) ABSTRACT

A method and computer program for extracting an embedded message from a digital image, the embedded message being formed by convolution with a carrier, employs a message template indicating the relative locations of data in the embedded message, the relative locations of the data being such that the autocorrelation of the message template is strongly peaked. An arbitrary region of the digital image is correlated with the carrier to extract a cyclically shifted message from the digital image. The absolute value of the cyclically shifted message is taken to form a positive valued cyclically shifted message. The positive valued cyclically shifted message is correlated with the message template to form a shifted offset image having a peak amplitude representing the location of the message boundary. The location of the message boundary is employed to extract the hidden message.

12 Claims, 5 Drawing Sheets

METHOD AND COMPUTER PROGRAM FOR EMBEDDING AND EXTRACTING AN EMBEDDED MESSAGE FROM A DIGITAL IMAGE

The disclosure in the compact disc appendix of this patent disclosure of this patent document contains material to which a claim of copyright protection is made. The copyright owner grants the right to third parties for facsimile reproduction of any one of the patent documents or the patent disclosure, as it appears in the U.S. Patent and Trademark Office patent file or records, but reserves any and all other rights whatsoever not expressly granted herein.

FIELD OF THE INVENTION

The invention relates generally to the field of image processing, and in particular to embedding and extracting hidden messages in digital image data. This field is also referred to as data hiding, information hiding, watermarking and also steganography.

BACKGROUND OF THE INVENTION

U.S. patent application Ser. No. 08/848,112, filed Apr. 28, 1997 and allowed Sep. 23, 1999, entitled "Method For Generating An Improved Carrier For Use In An Image Data Embedding Application," by Honsinger et al., discloses a technique for embedding messages in digital images data. This method for embedding a hidden message into a digitized image includes the steps of: forming a digitized version of the desired message; generating a random phase carrier; convolving the digitized version of the desired message and the random phase carrier to form a dispersed message; and combining the dispersed message with the digitized image to form an embedded hidden message image. Hidden messages may be embedded in photographic images recorded on film and paper using conventional photographic printing techniques, or they may be embedded in images produced on printers such as ink jet and thermal dye transfer printers, by combining the dispersed message with a digital image using digital image processing techniques.

The hidden messages are recovered from the embedded hidden message image by cross correlating the embedded hidden message image containing the dispersed message with a decoding carrier to recover the embedded dispersed message; and extracting the digital message data from the recovered dispersed message.

One known technique for extracting a dispersed message when the image has been cropped and/or rotated employs, a separate calibration signal contained in the image. Once the calibration signal was found, it is used to determine the dispersed message boundaries and the knowledge of the boundaries is employed to extract the message from the image. Such a technique is described in U.S. Pat. No. 5,850,481 issued Dec. 15, 1998 to Rhoads.

One problem with adding a calibration signal to an image is that it takes extra bandwidth that could be used for other purposes such as storing more information in the hidden message. There is a need therefore for an improved method of identifying the dispersed message boundaries without the need for a separate calibration signal to aid in extraction of the dispersed message.

SUMMARY OF THE INVENTION

The present invention is directed at overcoming the need for a calibration signal to find the message boundary in an embedded message. Briefly summarized, according to one aspect of the present invention a method for extracting an embedded message from a digital image, the embedded message being formed by convolution with a carrier, employs a message template indicating the relative locations of data in the embedded message, the relative locations of the data being such that the autocorrelation of the message template is strongly peaked. An arbitrary region of the digital image is correlated with the carrier to extract a cyclically shifted message from the digital image. The absolute value of the cyclically shifted message is taken to form a positive valued cyclically shifted message. The positive valued cyclically shifted message is correlated with the message template to form a shifted offset image having a peak amplitude representing the location of the message boundary. The location of the message boundary is employed to extract the hidden message.

The present invention has the advantage of avoiding the need for calibration signals to indicate the location of the embedded data in the image.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
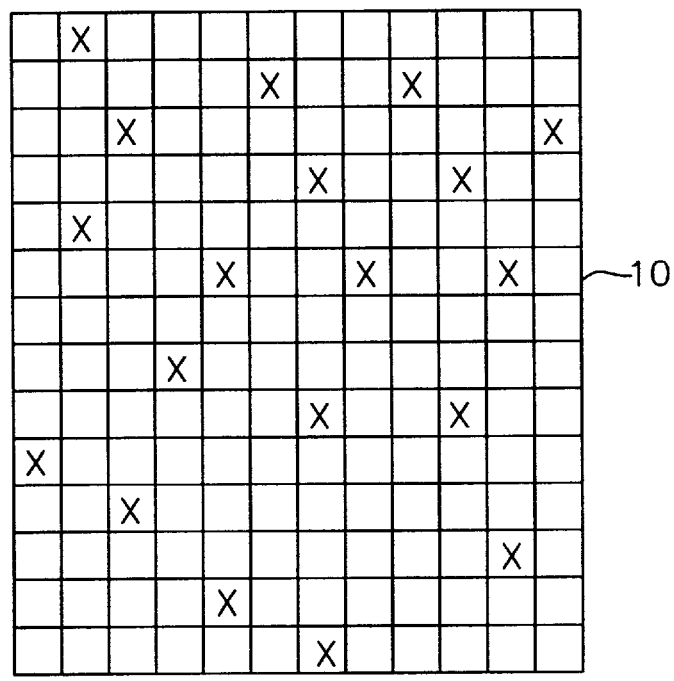
FIG. 1 shows a message template employed with the present invention.

Referring to FIG. 1, the present invention employs a message template 10 that is used to indicate the location of the data in a message that is to be embedded in an image. The locations, indicated by the x's in FIG. 1, are filled in a predetermined order so that the extraction algorithm knows where to look for the data. As shown in FIG. 1 the message template 10 is represented as a rectangular array of pixel locations, however, it is recognized that its implementation could be a set of ordered values in a lookup table indicating the locations of the message data in an array. The message to be embedded is represented by a stream of bits. The stream of bits are represented as + or −1 (+1 representing an original bit value of 1 and −1 representing an original bit value of 0) at the locations indicated by an "x" in the template; all other locations are filled by 0's. The template is used both to embed and to extract message data from the digital image. It is preferred that the image be represented using floating point numbers so that issues of quantization and sign are minimized.

Figure 2:
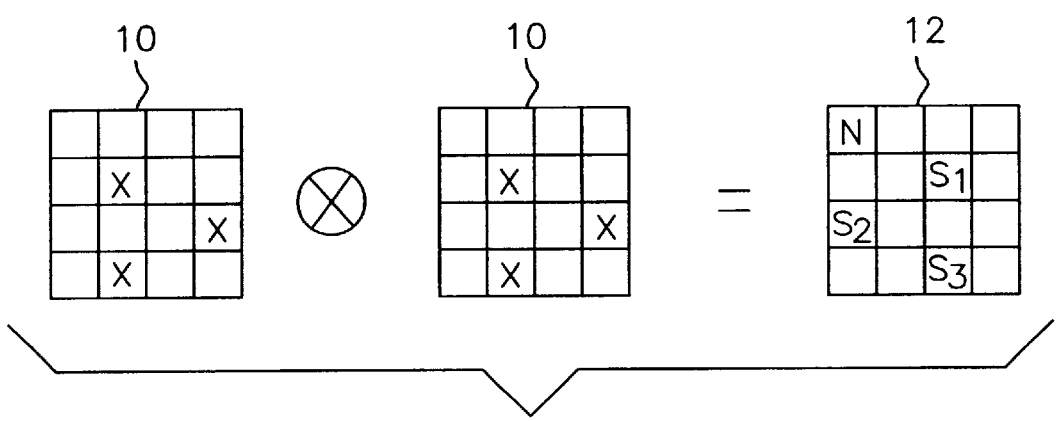
FIG. 2 shows the process of the autocorrelation of a simple message template.

Referring to FIG. 2, the message template (10) is preferably optimized so that its autocorrelation represented by a star in FIG. 2 is highly peaked. The autocorrelation is the sum of a cyclic dot product of the template with itself. At zero offset, the autocorrelation value will be a maximum. At other offsets, the autocorrelation value can vary between zero and the maximum. FIG. 2 is a diagram representing the autocorrelation 12 of a template 10. The result includes a zero offset value N (equal to the number of data positions in the template) and non zero offset values, referred to as sidelobes $S_i$. To say that the autocorrelation is highly peaked, means that the zero offset value N is significantly greater than any of the sidelobes $S_i$. For example, for a template having 130 data positions, the peak value N of the autocorrelated template would be 130, and for a highly peaked autocorrelation, the values of the sidelobes would preferably all be less than or equal to a small number, such as 5. An example of a poorly designed message template would result if the data were located at the corners of a uniform rectangular grid, the sidelobes of an autocorrelation of this configuration would become indistinguishable from the zero offset value.

To mathematically describe how the boundaries of an embedded message may be found, assume that the spatially dispersed embedded message having a known size has been added to a digital image and the digital image with the embedded message has been cropped. The embedded message may have been tiled onto the digital image, or completely cover the digital image. In either event the method of the present invention is effective to locate the boundary of the embedded message so that it can be recovered. Assume further that the image has been corrected for rotation and scale and any possible aspect ratio alterations. The rotation and scale correction can be accomplished using the technique described in U.S. Pat. No. 5,835,639 issued Nov. 10, 1998 to Honsinger et al. Lastly, assume that we are given an arbitrary region of the digital image with the embedded message having a size less than or equal to the known size of the embedded message.

Figure 3:
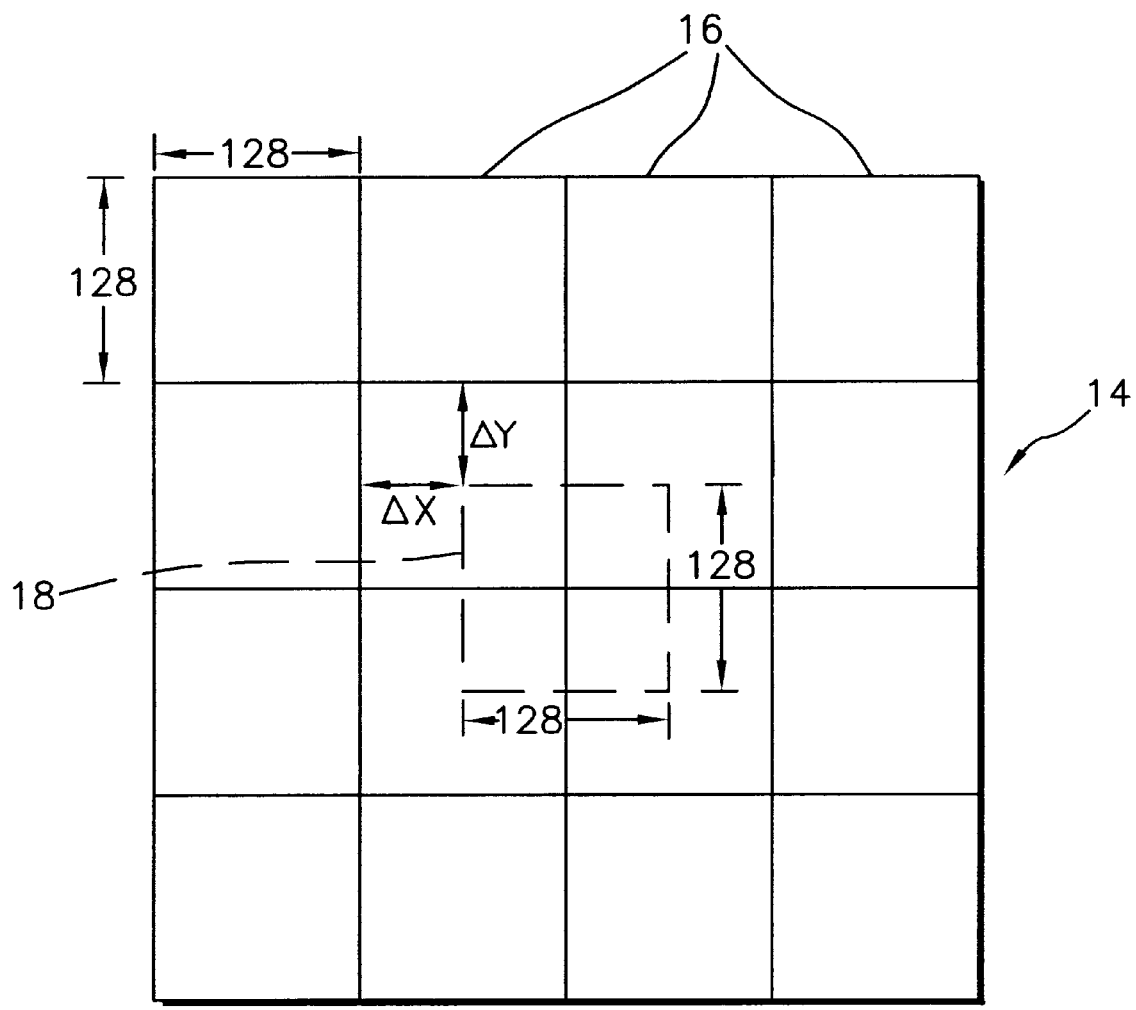
FIG. 3 is a diagram showing the dispersed message boundaries in relation to an arbitrarily chosen extraction region.

Referring to FIG. 3, an image 14 having an embedded message 16 that has been tiled over the image 14 is schematically shown. The embedded message 16 is represented for example as having a size of 128×128 pixels. As can be seen from FIG. 3, the effect of taking an arbitrary region 18 of the image may be described by a cyclic convolution of the spatially dispersed message data with a shifted delta function $\delta(\Delta x, \Delta y)$, whose shift, $(\Delta x, \Delta y)$, is precisely the distance to the actual boundary at which the spatially dispersed message data was placed. By knowing this distance we can find the message boundary.

Figure 6:
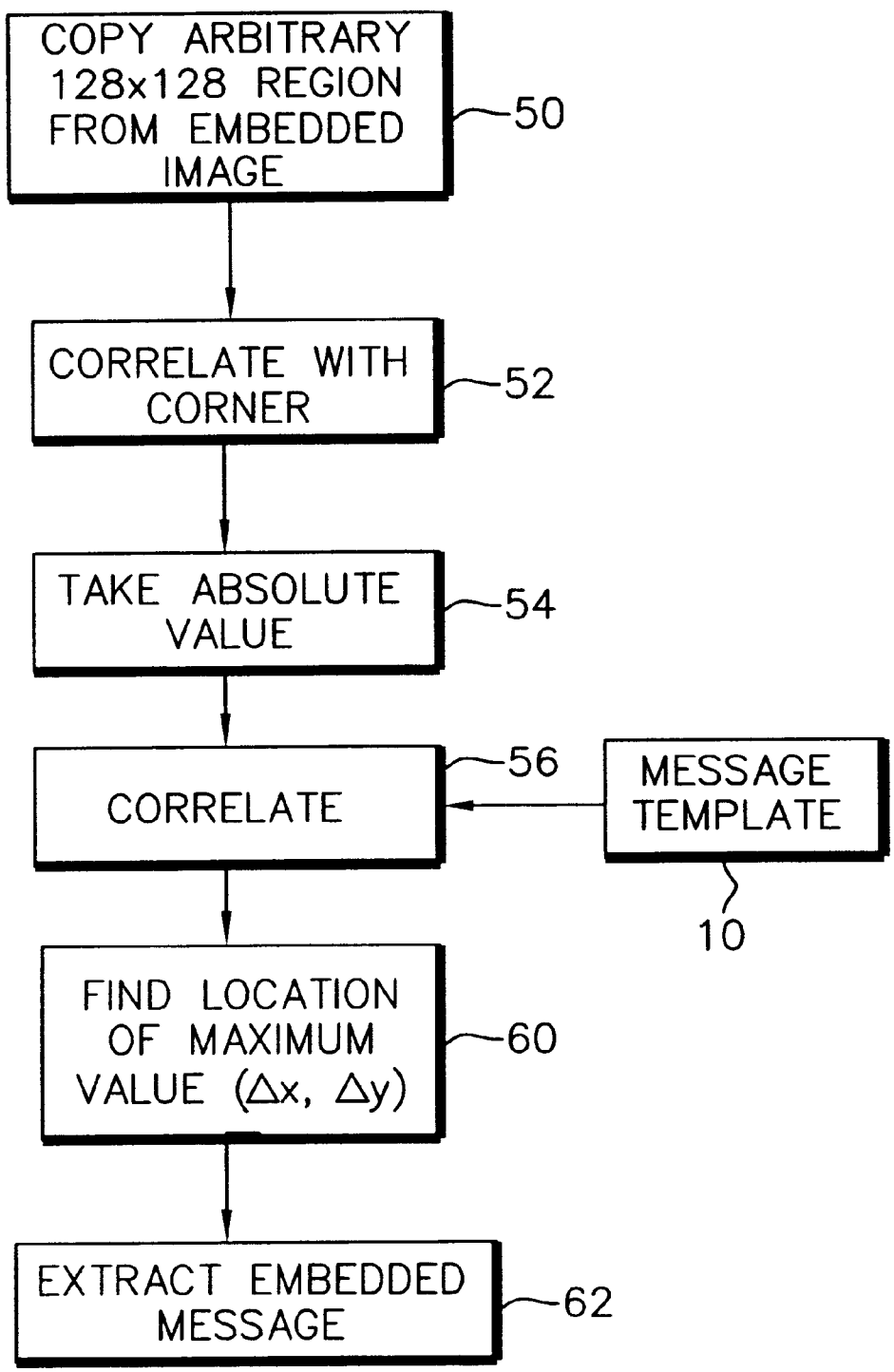
FIG. 6 is a block diagram illustrating the process of locating the message boundaries from an embedded image.

The arbitrary image region 18 discussed above, may be mathematically described as:

$$\delta(\Delta x, \Delta y)$$
$$I'(x,y) = I(x,y) + \delta(\Delta x, \Delta y) * (\alpha(M(x,y) * C(x,y)), \quad \text{Eq. (1)}$$

where I'(x,y) is the digital image having an embedded message, I(x,y) is the original digital image: $\delta(\Delta x, \Delta y)$ is a delta function with offset $(\Delta x, \Delta y)$; * represents the operation of cyclic convolution: $\alpha$ is a multiplicative constant chosen to make the embedded message invisible to the human observer; M(x,y) is the original message; and C(x,y) a random carrier, which is substantially of uniform amplitude in the frequency domain, with the exception of very low frequencies which are zero, resulting in a carrier with zero mean Referring to FIG. 6, the message is recovered by first copying (50) the arbitrary region 18 from the image 14. Next, the arbitrary region 18, is correlated (52) with the carrier that was employed to spatially disperse the embedded message.

If we correlate both sides of equation 1) with C(x,y) as follows, $$I'(x,y) \otimes C(x,y) = I(x,y) \otimes C(x,y) + \delta(\Delta x, \Delta y) * (\alpha(M(x,y) * C(x,y))) \otimes C(x,y) \quad \text{Eq. (2)}$$

the result will be a cyclically shifted original message corrupted somewhat by noise. The first term, representing the corrupting noise, is small, $I(x,y) \otimes C(x,y) \approx 0$. So that, $$I'(x,y) \otimes C(x,y) \approx \delta(\Delta x, \Delta y) * \alpha(M(x,y) * (C(x,y) \otimes C(x,y))) \quad \text{Eq. (3)}$$

And furthermore, since the carrier is random, and substantially uniform in amplitude in the frequency domain, $$C(x,y) \otimes C(x,y) \approx \delta(x,y) \quad \text{Eq. (4)}$$

So that, $$I'(x,y) \otimes C(x,y) \approx \delta(\Delta x, \Delta y) * \alpha(M(x,y)) \quad \text{Eq. (5)}$$

The above analysis shows that the end result of correlating the arbitrary region (18) with the carrier is the original message cyclically shifted by the distance $(\Delta x, \Delta y)$.

Next, the absolute value of the cyclically shifted message is taken (54) to form a positive valued cyclically shifted message. Since the embedded signal was correlated with a zero mean carrier signal, from Fourier theory, the result: $I'(x,y) \otimes C(x,y) \approx \delta(\Delta x, \Delta y) * M(x,y)$, is also a zero mean signal. This result implies that taking the absolute value (54) of: $\delta(\Delta x, \Delta y) * M(x,y)$ or $I'(x,y) \otimes C(x,y)$ is the same as a cyclically shifted message template. It is noted that the absolute value of any embedded message will have the same form as the message template, since the embedded message differs from the message template only by the existence of −1's. At corresponding positions in the message template, these values are +1's. Next, the positive valued cyclically shifted message is correlated (56) with the message template (10). Then the maximum correlation value location is found and identified with the offset $(\Delta x, \Delta y)$ (60). Thus, by correlating the absolute value of the correlation of an arbitrary image region that has been correlated with a carrier having an embedded message with the message template (18), the message boundary offsets $(\Delta x, \Delta y)$ can be obtained by finding the maximum correlation value location and equating this location to $(\Delta x, \Delta y)$. Finally, using the message boundary offsets, the embedded message is extracted by either restarting the extraction process at $(-\Delta x, -\Delta y)$ or by cyclically shifting the extracted message by $(-\Delta x, -\Delta y)$ (62).

Figure 4:
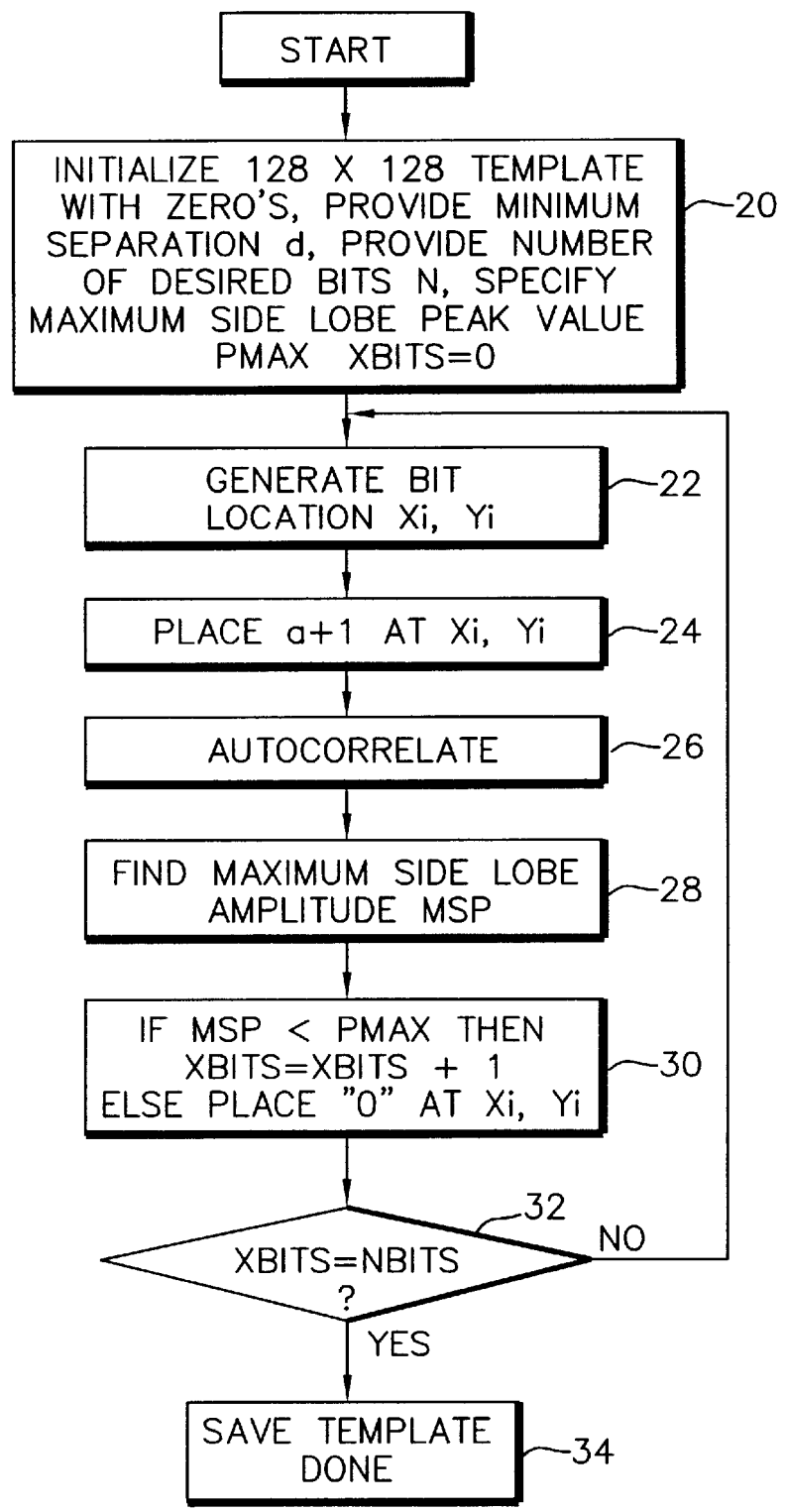
FIG. 4 is a block diagram illustrating a method to construct a message template.

As described previously, the message template employed in the method of the present invention has an autocorrelation that is highly peaked. One method of generating such a message template will now be described with respect to FIG. 4. Each pixel within the message template is initially assigned a value of zero. A minimum bit separation distance, d is provided by the user that ensures that autocorrelation sidelobe interference is minimal. A presently preferred bit separation is 3 or 4 pixels for a message template of physical size 128×128 pixels and 130 bits of message data. The number of bits, NBITS to be included in the message are provided, and the maximum amplitude of the sidelobe autocorrelation peaks (Pmax), of the message template is specified by the user (20). A bit location point (Xi,Yi) is generated (22). The bit location includes an x and a y value between 0 and 127, each randomly generated but subject to constraints. Next a pixel value of +1 (24) is placed at the location (Xi,Yi) in the message template. The message template is then subject to autocorrelation (26). Next the autocorrelation of the message template is examined for the maximum sidelobe amplitude (28), MSP. MSP is tested against the user input maximum value PMAX (30). If MSP is less than or equal to PMAX the algorithm was successful in identifying a satisfactory bit location and the bit placement values are used. This implies that the number of bits available on the message template can be incremented by one. If MSP is greater than PMAX, then a "0" is placed at (Xi,Yi) to remove the value placed there before the autocorrelation. Now, since the total number of bits calculated might have changed, the next step is to check whether the algorithm has achieved the user's desired number of bits, NBITS (32). If so, then the message template is saved (34), and the generation is complete. Otherwise, the algorithm returns to generate another bit location (2).

Figure 5:
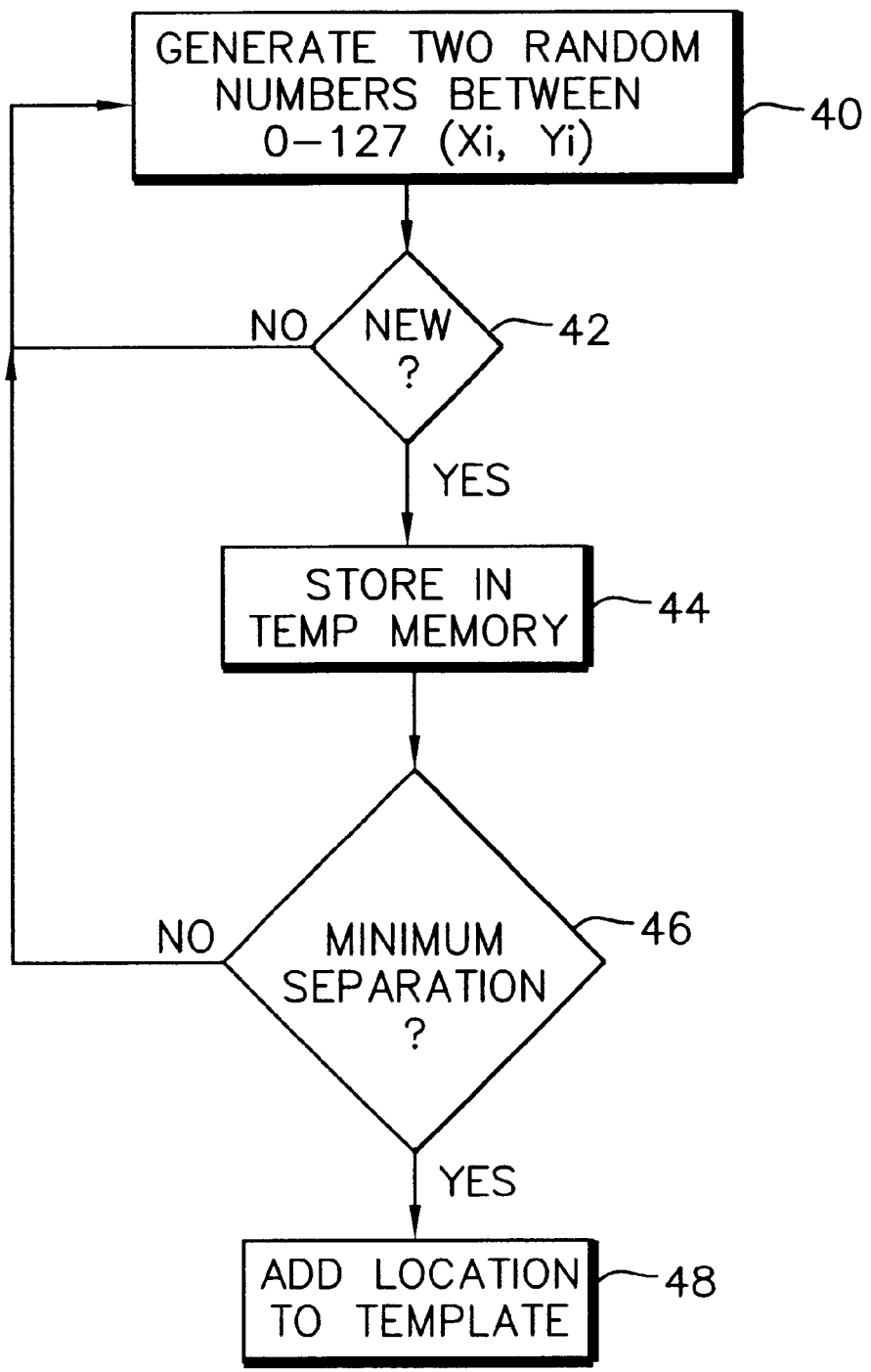
FIG. 5 is a block diagram illustrating a method to construct candidate bit location positions for use in the message template.

The step (2) of generating a bit location is further described in FIG. 5. The object of bit location generation is to provide a reasonable guess at values for (Xi,Yi). A random number generator (for example, the kind found in a "C" runtime library is sufficient) is used to generate (40) two numbers between 0 and 127, (Xi,Yi). The number pair is then tested to see if it is new (42) and if new, stored (44) in temporary memory for later testing against newly generated pairs of numbers. If not new, then another number pair is generated. These numbers are used to represent the location of a candidate for bit placement. Before these numbers can be tested for their impact on the autocorrelation sidelobes, they are tested (46) to make sure that their distance from all other previously defined bit location positions is less than the minimum distance required. This is accomplished by searching the message template for pixel locations having a "+1" instead of a "0" and finding the distance using the distance formula sqrt((xi−xj)2+(yi−yj)2)<d, where (xi,yi) is the point being tested and (xj,yj) are the previously selected points. If the candidate meets the minimum separation test, it is added to the template (48). By following this process, a message template may be formed that will satisfy the objectives of this invention.

Although the above-described technique will produce a message template that meets the user-defined criteria, it does not insure that a globally optimum template will be generated. To generate a globally optimum template, techniques known in the art such as stochastic annealing or genetic algorithms may be employed.

It should be noted that once a template is formed, it can be used repeatedly and does not need to be regenerated. However, the process of finding a template in this fashion does require intense computer resources at one time, which are not available to everyone. An alternative method of generating a message template involves arranging the message data bits in concentric circles, for example with circle centers at the point (64,64) for a 128×128 pixel template. Each successive circle has a difference in radius, d from its closest inner neighbor. Along each perimeter of a circle, the bit location values are placed pseudo randomly with no two placements being closer than the distance d from another. By imposing circular constraints to the problem, we effectively eliminate one of the two dimensions of the searching process, alleviating the algorithm's taxation on computer resources. Yet another technique is to reduce the dimensionality by imposing the condition that the bit locations are located on a spiral. Each random bit location along the spiral is tested for its impact on sidelobes in a manner that is similar to the above algorithm. We have found that this circular and spiral template generation method produces very satisfactory results.

In some cases simply starting this process with a single copied image region 18 is not enough. These cases may occur on embedded images with very poor signal to noise ratios. For example, we have found that ink-jet prints of small images on ordinary paper produce too much noise. In these cases, we have found that summing congruent (128× 128) blocks can alleviate this problem, because the underlying images destructively add while the common signal, the cyclically shifted spatially dispersed message constructively adds. By congruent, we mean that the blocks are located at the same relative modular locations. For example if the blocks are consecutive, they will be congruent, or if every other consecutive block is chosen, they will be congruent. One can imagine that the image is divided into a grid of blocks of 128×128 pixels. Any block will then be congruent with any other block in the grid according to the present definition of congruent. Since we assume that changes of rotation and scale have been corrected, performing this addition among congruent blocks will guarantee that each 128×128 region is added with an identical message displacement ($\Delta x, \Delta y$). Therefore, the processes described in FIG. 6 can be applied using this "summed" arbitrary region without further modification of the methods herein disclosed.

In other cases, we may not be provided an embedded image with more than 128×128 pixels. In this case, we also assume that the image has been corrected for rotation and scale changes. The preferred method for producing the 128×128 image region 18, in this case, is to copy the entire image into a 128×128 blank (zero filled) buffer and proceed as detailed through the methods disclosed herein without further modification. We have shown that this process can work very well for images that have minimal signal to noise degradation.

The present invention is preferably practiced in an image processing system including a source of digital images, such as a scanner, a computer programmed to process digital images, and an output device such as a thermal or inkjet printer. The method of the present invention may be sold as a computer program product including a computer readable storage medium bearing computer code for implementing the steps of the invention. Computer readable storage medium may include, for example; magnetic storage media such as a magnetic disc (e.g. a floppy disc) or magnetic tape; optical storage media such as optical disc or optical tape; bar code; solid state electronic storage devices such as random access memory (RAM)or read only memory (ROM); or any other physical device or medium employed to store a computer program.

Appendix A contains a computer program written in the C++ language for extracting an embedded message from a digital image according to the present invention.

The present invention is useful for extracting hidden messages from photographic images recorded on film or paper and images that have been produced using digital printing techniques such as inkjet, electrographic, or thermal printing.

The invention has been described in detail with particular reference to certain preferred embodiments thereof, but it will be understood that variations and modifications can be effected within the scope of the invention.

PARTS LIST 10 message template
12 autocorrelation of message template
14 image
16 embedded message
18 arbitrary image region
20 initialization step
22 generate bit location step
24 place bit value at location step 26 autocorrelation step
28 find maximum sidelobe step
30 test sidelobe value step
32 check number of bits step
34 save template step
40 generate random number step
42 test uniqueness step
44 storage step
48 add location to template step
46 separation test step
50 copying step
52 correlation step
54 take absolute value step
56 correlation step
60 find maximum value location step
62 extract embedded message step

What is claimed is:

1. A method for extracting an embedded binary message from a digital image, the embedded message being formed by convolution with a carrier, comprising the steps of:
   a) providing a message template indicating the relative locations of data in the embedded message, the relative locations of the data being such that the autocorrelation of the message template is strongly peaked at zero offset with substantially smaller sidelobes occurring at nonzero offset locations and further such that no bit location is closer to another bit location by less then three pixels and further arranged substantially along concentric circles or along a spiral pattern;
   b) correlating an arbitrary region of the digital image with the carrier to extract a cyclically shifted binary message from the digital image;
   c) taking the absolute value of the cyclically shifted message to form a positive valued cyclically shifted binary message;
   d) correlating the positive valued cyclically shifted binary message with the message template to form a shifted offset image having a peak amplitude representing the location of the message boundary; and
   e) employing the location of the message boundary to extract the hidden message.

2. The method claimed in claim 1, wherein the step of correlating an arbitrary region with the carrier, comprises the steps of: summing a plurality of congruent arbitrary regions and correlating the carrier with the resulting sum.

3. The method claimed in claim 1, wherein the arbitrary region has the same size as the message template.

4. The method claimed in claim 1, wherein the arbitrary region has a size that is smaller than the message template.

5. The method claimed in claim 1, further comprising the step of correcting the rotation and scale of the digital image prior to the correlation of the arbitrary region with the carrier.

6. A message template indicating the relative locations of data in a message that is to be embedded in an image, the relative locations of the data being such that the autocorrelation of the message template is strongly peaked at zero offset with substantially smaller sidelobes occurring at non-zero offset locations and further such that no bit location is closer to another bit location by less then three pixels and further arranged substantially along concentric circles or along a spiral pattern.

7. A method of embedding a message in an image, comprising the steps of:
   a) providing a message template indicating the relative locations of data in the embedded message, the relative locations of the data being such that the autocorrelation of the message template is strongly peaked at zero offset with substantially smaller sidelobes occurring at non-zero offset locations and further such that no bit location is closer to another bit location by less then three pixels and further arranged substantially along concentric circles or along a spiral pattern;
   b) placing message data bits at the data bit locations defined by the template;
   c) convolving the message data in the template with a carrier to form a dispersed message; and
   d) combining the dispersed message with the image.

8. An image having an embedded message produced by the method of claim 7.

9. A computer program embodied on a computer readable medium for extracting an embedded message from a digital image, the embedded message being formed by convolution with a carrier, comprising the steps of:
   a) accessing a message template indicating the relative locations of data in the embedded message, the relative locations of the data being such that the autocorrelation of the message template is strongly peaked at zero offset with substantially smaller sidelobes occurring at non-zero offset locations and further such that no bit location is closer to another bit location by less then three pixels and further arranged substantially along concentric circles or along a spiral pattern;
   b) correlating an arbitrary region of the digital image with the carrier to extract a cyclically shifted binary message from the digital image;
   c) taking the absolute value of the cyclically shifted message to form a positive valued cyclically shifted binary message;
   d) correlating the positive valued cyclically shifted binary message with the message template to form a shifted offset image having a peak amplitude representing the location of the message boundary; and
   e) employing the location of the message boundary to extract the hidden message.

10. The method claimed in claim 9, wherein the arbitrary region has the same size as the message template.

11. The method claimed in claim 9, wherein the arbitrary region has a size that is smaller than the message template.

12. The method claimed in claim 9, further comprising the step of correcting the rotation and scale of the digital image prior to the correlation of the arbitrary region with the carrier.

* * * * *